June 23, 1959
S. KAYE
2,891,838
NON-INFLAMMABLE EXTHYLENE OXIDE STERILANT
Filed April 10, 1957
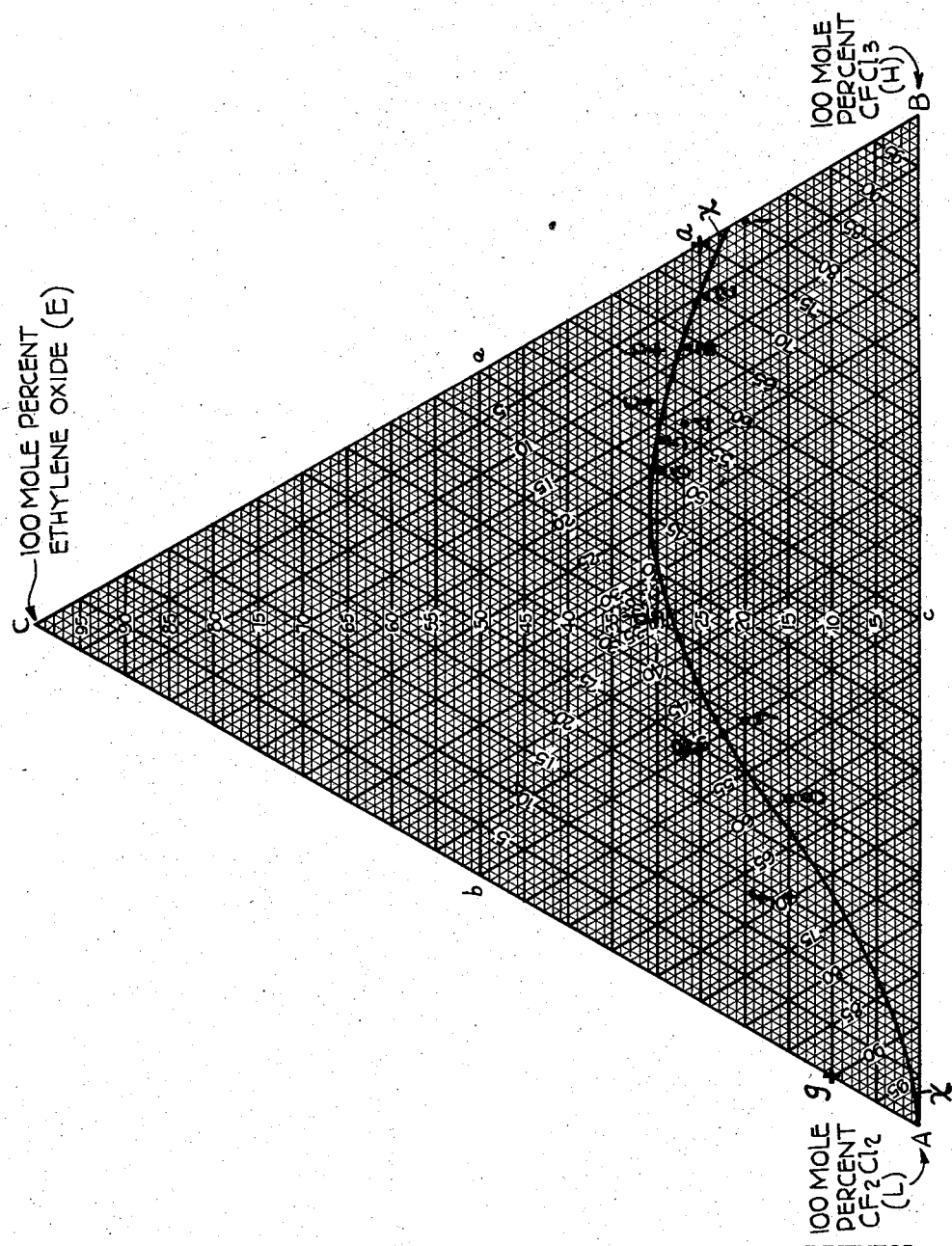
INVENTOR.
SAUL KAYE
BY Bosworth, Sessions
Herrstrom + Knowles
ATTORNEYS.

United States Patent Office 2,891,838
Patented June 23, 1959

2,891,838
NON-INFLAMMABLE ETHYLENE OXIDE STERILANT

Saul Kaye, Maple Heights, Ohio, assignor to Ben Venue Laboratories, Inc., Pittsburgh, Pa., a corporation of Pennsylvania Application April 10, 1957, Serial No. 651,873

4 Claims. (Cl. 21—58)

This invention relates to volatile sterilants and to means for rendering the same non-flammable and non-explosive both in the liquid and vapor states.

A sterilant in this application is understood to mean a chemical sterilizing agent. Such an agent must be capable of completely inactivating, or destroying the viability of all types of microorganisms, including viruses, rickettsiae, bacteria, spores, and fungi, as well as larger organisms such as insects and their eggs and larvae contained on or in inanimate objects. A volatile sterilant is one which acts chiefly in the vapor state; while it may be introduced as a cold or compressed liquid or by other suitable means to a confined space, such a sterilant performs its sterilizing and fumigating function after evaporating to the vapor state.

More particularly this invention relates to volatile alkylene oxide sterilants and to means for diluting the same whereby the alkylene oxide is rendered non-flammable and non-explosive at all times before, during, and after its evaporation. The use of alkylene oxide vapors and solutions for sterilization and fumigation has been practised for some time; however, because of their explosiveness and flammability, difficulties and dangers have been experienced in adopting these compounds for wide use by industry and the general public. As an example, ethylene oxide, the most active sterilant of this type, boils at 51.3° F., has a flash point well below 0° F., and its vapors form explosive mixtures with air in all proportions from 3% to 100% by volume.

Some measure of relief has been obtained from the explosive and flammability characteristics of ethylene oxide by diluting the ethylene oxide with carbon dioxide and marketing the same as a liquid solution under high pressure and/or low temperature.

In many applications, however, the ethylene oxide-carbon dioxide solution has proven unsatisfactory because of the markedly different vapor pressures and boiling points of the two substances. As a result the carbon dioxide rapidly and prematurely evaporates relative to the ethylene oxide, leaving behind pure or substantially pure ethylene oxide, which, naturally, has all of the undesirable flammability characteristics which it was sought to avoid. Further, once a solution of carbon dioxide-ethylene oxide has been evaporated a local or sudden cooling is often sufficient to condense all or part of the ethylene oxide without, however, condensing the carbon dioxide thereby separating the ethylene oxide from the carbon dioxide with consequent dangers of fire and explosion as noted above. The first of these problems has arisen, for example, when high pressure cylinders are used for shipping the carbon dioxide-ethylene oxide solution because of the ever present danger that when the pressure is released and the gas expelled the cooling effect, upon evaporation, will cause the ethylene oxide to liquefy and separate out while the carbon dioxide remains in the vapor phase, thereby creating the dangerous conditions aforementioned.

The problems incident to local or sudden cooling may occur, for example, adjacent the walls of the container or duct within which the solution is being used with the result that the ethylene oxide condenses out on the walls and runs down the same and collects in pools at the bottom thereof while the temperature remains high enough to prevent the carbon dioxide from condensing. Here too the liquid ethylene oxide presents an undesirable and potentially dangerous situation.

It is therefore a general object of my invention to provide a sterilant or other substance, which is otherwise flammable and explosive, in mixture with a diluent, which is non-reactive therewith, in such proportions that at all times and temperatures and in all liquid-vapor phase relationships the mixture is non-flammable and non-explosive. A further object of my invention is to provide an improved, commercially satisfactory and practical sterilant mixture in which the sterilant and its diluent are in proportions and have respective boiling points and vapor pressures such that the sterilant-diluent mixture is non-flammable and non-explosive without regard to the percentage of sterilant and/or diluent which has evaporated or having evaporated has condensed.

Another object of my invention is to provide a sterilant which comprises an alkylene oxide mixed with a non-flammable, mutually non-reactive diluent in such proportions that during evaporation and/or condensation and in all liquid-vapor phase relationships the mixture is non-flammable and non-explosive and the vapor, generated or remaining, and the liquid residue, if any, are non-flammable.

Still another object of my invention is to obtain an increased concentration of alkylene oxide in a non-flammable mixture by providing at least two non-flammable diluents, one more volatile and one less volatile than the alkylene oxide, in such proportions that the mixture is non-flammable at all times before, during and after evaporation.

Other objects of my invention include the provision of a volatile sterilant comprising a mixture of ethylene oxide and halogenated alkanes, having higher and lower boiling points and vapor pressures than the ethylene oxide, in such proportions that the mixture is non-flammable and non-explosive before, during, and after evaporation or condensation, and the provision of a volatile sterilant comprising a mixture of ethylene oxide, trichloromonofluoromethane and dichlorodifluoromethane in such proportions that the mixture is non-flammable and non-explosive at all times, temperatures and pressures and in all liquid-vapor phase relationships.

These and other objects and advantages of my invention will appear from the following description thereof, reference being made to the drawing, which is a graph with triangular coordinates, showing mole percentages of ethylene oxide, trichloromonofluoromethane and dichlorodifluoromethane in mixtures which are non-flammable.

Broadly, as noted above the purpose of my invention is to render flammable and explosive substances non-flammable and non-explosive by dilution with suitable non-reactive non-explosive and non-flammable diluents. More particularly, my invention provides a solution or mixture of sterilant and diluent which is non-flammable and non-explosive, albeit the sterliant is otherwise chemically active, flammable and explosive. My invention further teaches that a greater molar concentration of sterilant may be incorporated in a mixture, embodying my invention, which comprises a sterilant and a plurality of flammability suppressants or diluents which have boiling points and vapor pressures both higher and lower respectively than said sterilant and are chemically non-reactive with the sterilant and have no adverse effect on the activity of the sterilant as a sterilizer and which are mixed together in such proportions that before and upon the initiation of evaporation and at all times thereafter and without regard to subsequent condensation and/or evaporation, both the evaporated mixture and the residual liquid are non-flammable and, a fortiori, non-explosive.

Specifically my invention provides means for rendering ethylene oxide and other alkylene oxides safe to handle and use for sterilizing, which obviates the necessity for bulky, expensive and cumbersome apparatus and precludes the possibility that the diluent may evaporate and leave behind dangerous proportions of the oxide or the oxide may condense alone and separate out from the diluent.

To this end I provide, for example, a mixture of ethylene oxide and trichloromonofluoromethane and dichlorodifluoromethane in such proportions that the mixture is at all times non-flammable. The following are examples of mixtures which have been prepared and which embody my invention and have varying proportions of ethylene oxide, dichlorodifluoromethane (boiling point at one atmosphere of pressure, minus 21.6 degrees F.), and trichloromonofluoromethane (boiling point at one atmosphere of pressure 74.8 degrees F.), and are at all times and in all liquid-vapor phase relationship non-flammable.

EXAMPLE 1

A mixture containing 20 mole percent of ethylene oxide (7.4% by weight) and 80 mole percent of trichloromonofluoromethane (92.6% by weight) was prepared from the cold pure ingredients and sealed in a container. When this solution was cooled to −30° F. and the flash point determined by the Cleveland Open Cup Method as set forth by the American Society for Testing Materials, it was found to have no flash point and to be non-flammable as the temperature was slowly raised to 75° F., at which temperature the entire solution evaporated.

EXAMPLE 2

A mixture containing 25.5 mole percent of ethylene oxide (10.0% by weight), 69.0 mole percent trichloromonofluoromethane (84.1% by weight) and 5.5 mole percent of dichlorodifluoromethane (5.9% by weight) was prepared from the cold pure ingredients and sealed in a container. The flash and firepoints were then tested in the manner set forth in Example 1, above and the mixture was determined to be non-flammable.

EXAMPLE 3

A mixture containing 27.5 mole percent of ethylene oxide (11.0% by weight), 63.4 mole percent trichloromonofluoromethane (79.0% by weight) and 9.1 mole percent dichlorodifluoromethane (10.0% by weight) was prepared from the cold pure ingredients and sealed in a container. The flash and firepoints were then tested in the manner set forth in Example 1 above and the mixture was determined to be non-flammable.

EXAMPLE 4

A mixture containing 27.5 mole percent ethylene oxide (11.1% by weight), 55.7 mole percent trichloromonofluoromethane (70.5% by weight) and 16.8 mole percent dichlorodifluoromethane (18.4 percent by weight) was prepared from the cold pure ingredients and sealed in a container. The flash and firepoints were then tested in the manner set forth in Example 1 above and the mixture was determined to be non-flammable.

EXAMPLE 5

A mixture containing 30.0 mole percent ethylene oxide (12.4% by weight), 53.8 mole percent trichloromonofluoromethane (69.3% by weight) and 16.2 mole percent dichlorodifluoromethane (18.3 percent by weight) was prepared from the cold pure ingredients and sealed in a container. The flash and firepoints were then tested in the manner set forth in Example 1 and the mixture was determined to be non-flammable.

EXAMPLE 6

A mixture containing 30.0 mole percent ethylene oxide (12.4% by weight) 50.0 mole percent trichloromonofluoromethane (64.8% by weight) and 20.0 mole percent dichlorodifluoromethane (22.8% by weight) was prepared from the cold pure ingredients and sealed in a container. The flash and firepoints were then tested in the manner set forth in Example 1 above and the mixture was determined to be non-flammable.

EXAMPLE 7

A mixture containing 20.0 mole percent ethylene oxide (8.0% by weight), 30.0 mole percent trichloromonofluoromethane (37.3% by weight) and 50.0 mole percent dichlorodifluoromethane (54.7% by weight) was prepared from the cold pure ingredients and sealed in a container. The flash and firepoints were then tested in the manner set forth in Example 1 above and the mixture was determined to be non-flammable.

EXAMPLE 8

A mixture containing 15.0 mole percent of ethylene oxide (5.8% by weight), 25.0 mole percent trichloromonofluoromethane (30.3% by weight) and 60.0 mole percent dichlorodifluoromethane (63.9% by weight) was prepared from the cold pure ingredients and sealed in a container. The flash and firepoints were then tested in the manner set forth in Example 1 above and the mixture was determined to be non-flammable.

The above are representative examples of mixtures of one sterilant, ethylene oxide, with the diluents trichloromonofluoromethane and dichlorodifluoromethane in such proportions that the mixture is non-flammable in all liquid-vapor phase relationships. Not all mixtures of ethylene oxide with these diluents are non-flammable, as is indicated by the examples set forth below.

Example A

A mixture containing 25.7 mole percent ethylene oxide (10.0% by weight) and 74.3 mole percent trichloromonofluoromethane (90% by weight) was prepared from the cold pure ingredients and placed in a sealed container. The mixture was cooled to −30° F. and its flash point determined in a Cleveland Open Cup apparatus as set forth by the American Society for Testing Materials. The mixture had a flash point of 25° F., and is therefore classified as a flammable material.

Example B

A mixture containing 29.4 mole percent ethylene oxide (11.9% by weight), 61.7 mole percent trichloromonofluoromethane (78.2% by weight) and 8.9 mole percent dichlorodifluoromethane (9.9% by weight) was prepared from the cold ingredients and placed in a sealed container. The mixture was cooled to −30° F. and its flash point determined in a Cleveland Open Cup apparatus as set forth by the American Society for Testing Materials. The mixture had a flash point of 55° F., and is therefore classified as a flammable material.

Example C

A mixture containing 30.3 mole percent ethylene oxide (12.5% by weight), 55.8 mole percent trichloromonofluoromethane (71.8% by weight) and 13.9 mole percent dichlorodifluoromethane (15.7% by weight) was prepared from the cold pure ingredients and placed in a sealed container. The mixture was cooled to −30° F. and its flash point determined in a Cleveland Open Cup apparatus as set forth by the American Society for Testing Materials. The mixture had a flash point of 55° F., and is therefore classified as a flammable material.

Example D

A mixture containing 30.0 mole percent ethylene oxide (12.8% by weight), 35.0 mole percent trichloromonofluoromethane (46.5% by weight) and 35.0 mole percent dichlorodifluoromethane (40.7% by weight) was prepared from the cold pure ingredients and placed in a sealed container. The mixture was cooled to −30° F. and its flash point determined in a Cleveland Open Cup apparatus as set forth by the American Society for Testing Materials. The mixture had a flash point of 50° F., and is therefore classified as a flammable material.

*Example E*

A mixture containing 25.0 mole percent ethylene oxide (10.4% by weight), 25.0 mole percent trichloromonofluoromethane (32.5% by weight) and 50.0 mole percent dichlorodifluoromethane (57.1% by weight) was prepared from the cold pure ingredients and placed in a sealed container. The mixture was cooled to −30° F. and its flash point determined in a Cleveland Open Cup apparatus as set forth by the American Society for Testing Materials. The mixture had a flash point of 45° F., and is therefore classified as a flammable material.

*Example F*

A mixture containing 15.0 mole percent ethylene oxide (5.9% by weight), 15.0 mole percent trichloromonofluoromethane (18.4% by weight), and 70.0 mole percent dichlorodifluoromethane (75.7% by weight) was prepared from the cold, pure ingredients and placed in a sealed container. The mixture was cooled to −30° F. and its flash point determined in a Cleveland Open Cup apparatus as set forth by the American Society for Testing Materials. The mixture had a flash point of 45° F., and is therefiore classifiied as a flammable material.

*Example G*

A mixture containing 10.0 mole percent ethylene oxide (4.0% by weight) and 90.0 mole percent dichlorodifluoromethane (96.0% by weight) was prepared from the cold pure ingredients and placed in a sealed container. The mixture was cooled to −30° F. and its flash point determined in a Cleveland Open Cup apparatus as set forth by the American Society for Testing Materials. The mixture had a flash point of 10° F., and is therefore classified as a flammable material.

Figure 1 sets forth in graphical form on triangular coordinates the results of the above examples, each numbered dot being the plot of the similarly numbered examples of non-flammable mixtures, and each lettered dot being the plot of the similarly lettered examples of flammable mixtures.

In Figure 1 Scale $aA$ defines the mole percentage of dichlorodifluoromethane, Scale $bB$ defines the mole percentages of trichloromonofluoromethane, and Scale $cC$ defines the mole percentages of ethylene oxide. The plot of the above examples establishes the curve X—X which separates the flammable compositions from non-flammable ones, and defines the interrelations of the percentages of ethylene oxide and the two diluents which are required to form the non-flammable mixtures. As is shown by the graph, non-flammable mixtures of these ingredients may contain as much as 30 mole percent of ethylene oxide, provided the mole percentages of the other two ingredients are as specified by the equations $$L+E+H=100 \quad (1)$$

and $$E \leqq 22+0.78L-.021L^2+.00011L^3 \quad (2)$$

In these equations, L symbolizes the mole percentage of dichlorodifluoromethane, E the mole percentage of ethylene oxide, and H the mole percentage of trichloromonofluoromethane. The condition that we have only a binary or ternary solution is expressed in Equation 1, while the maximum concentration of ethylene oxide which can be contained in any non-flammable binary or ternary mixture with compounds L and H is given in Equation 2.

It can be seen from the figure and the equation that the mole percentage of compound L required to give a non-flammable mixture can vary from 0 to 100 percent, while the concentration of compound H required to do the same can vary from 78 mole percent down to zero mole percent. This concentration of H is related to the molar concentration of L by the equation $$H \leqq 78-1.78L+.021L^2-.00011L^3$$

which is derivable from (1) and (2)

In selecting a composition to provide a non-flammable mixture, any composition on or below the line X—X may be chosen. It is desirable, however, to employ as high a concentration of ethylene oxide as possible, in order to perform sterilization with the greatest efficiency. It is apparent that a greater concentration of ethylene oxide can be contained in a non-flammable mixture containing both diluents than can be contained in a mixture containing a single diluent.

Mixtures of ethylene oxide, dichlorodifluoromethane, and trichloromonofluoromethane embodying my invention are no more toxic because of admixture than the individual constituents are separately and no extra precaution need be taken in this respect in handling such mixtures.

Other diluents may be used with ethylene oxide and other alkylene oxides or flammable volatile substances may be used with the same or other diluents provided the diluents are non-reactive with, and flammability suppressants for, the sterilant or flammable substance, have boiling points and vapor pressures which straddle those of the sterilant or flammable substances, and are admixed therewith in such proportions as to be non-flammable in accordance with the teachings of my invention. By way of example the following mixture embodying my invention was prepared:

EXAMPLE 9

A mixture containing 30.0 mole percent ethylene oxide (10.9% by weight), 35.0 mole percent trichloromonofluoromethane (39.6% by weight) and 35.0 mole percent dichlorotetrafluoroethane (49.5% by weight) was prepared my mixing the cold pure ingredients and sealing in a container. When this solution was cooled to −30° F. and the flash point determined by the Cleveland Open Cup Method as set forth by the American Society for Testing Materials, it was found to have no flash point and to be non-flammable as the temperature was slowly raised to 75° F., at which temperature the entire solution evaporated. This example is claimed in my copending application, Serial No. 791,114, filed February 4, 1959.

In use as a sterilant, a mixture embodying my invention may be used in a rigid or non-rigid gas-tight chamber, or in a rigid or non-rigid container, which, while not completely gas-tight, retains the sterilant and diluents sufficiently well to sterilize the contents. Said use may or may not involve prior evacuation of said rigid or non-rigid container, and may or may not include the concomitant use of elevated temperatures, to assist and expedite penetration and sterilization.

The following are examples of typical applications of non-flammable sterilant mixtures embodying my invention for sterilizing various objects under various conditions as set forth.

STERILIZATION EXAMPLE 1

A gasketed rigid vessel of 7 cubic feet capacity was fitted with an adapter by means of which the contents of a can of volatile sterilant could be admitted to the interior without opening the vessel. Into this vessel were placed a variety of surgical and dental instruments, thermometers, catheters, and small pieces of cotton fabric, each of which had previously been contaminated by immersion in a culture of one of the following microorganisms: *Micrococcus pyogenes* var. *aureus, Candida albicans, Chaetomium globosum,* and the spore form of *Bacillus*

*subtilis* var. *niger*. These contaminated instruments and fabrics were placed in paper envelopes amidst piles of linen and clothing, the chamber closed, and a reduced pressure of 14″ of mercury obtained in the chamber by means of a vacuum pump. Six hundred grams of a mixture whose composition corresponded to that of Example 3 above were admitted to the chamber, causing the pressure to return to atmospheric. The vessel was allowed to stand at 70° F. overnight (16 hours), after which it was once more evacuated and flushed with filtered air, after which the instruments and contaminated fabrics were removed and tested for sterility. Whereas untreated contaminated instruments and fabrics contained between $10^2$ and $10^6$ of the various microorganisms, all treated materials were sterile; i.e., no viable organisms could be recovered upon sampling and plating in appropriate media. No corrosive action, or residual sterilant could be noted after treatment.

STERILIZATION EXAMPLE 2

Instruments and fabrics similarly contaminated were exposed in envelopes in a 5 cu. ft. vessel to the vapors of 450 grams of a mixture of the composition given in Example 3 above. The insulated vessel walls had previously been warmed to 130° F. by running saturated steam through the vessel, and the walls were wiped dry before placing the instruments and the pierced container of sterilant within the vessel, and sealing it. The gas and instruments were allowed to stand for 2 hours, by which time the temperature had fallen to 100° F. All treated instruments and fabrics were found to be sterile, while similar contaminated materials subjected to the action of the elevated temperature alone were not sterile.

STERILIZATION EXAMPLE 3

Small bags, approximately 2 feet long and 2 inches wide, were prepared from various plastic films. Urinary catheters made of rubber and plastic were heavily contaminated by means of suspensions of *Micrococcus pyogenes* var. *aureus* and introduced into such bags, one end of which remained open. Into the open ends of several such bags were introduced various quantities of ethylene oxide in a non-flammable solution corresponding to that cited in Example 1 above, and the bag was sealed shut. Complete sterilization was effected overnight in bags treated with as little as ¼ ml. of solution, and in less than 4 hours in bags treated with 1 ml. of solution.

STERILIZATION EXAMPLE 4

A hospital mattress was contaminated with spores of *B. subtilis* var. *niger* and placed within a specially designed bag made of plastic film, together with two sealed containers containing 1000 grams of solution of ethylene oxide corresponding to Example 3. The bag was tied shut, and the can contents allowed to evaporate. After storage overnight at a temperature of 85° F., the spores had been inactivated and the mattress sterilized.

Modifications, changes, and improvements to the preferred and modified forms of my invention herein described may occur to those skilled in the art, who come to understand the precepts and principles of my invention. Therefore, I do not wish to be limited in the scope of my patent to the forms of my invention herein illustrated and described, nor in any manner inconsistent with the advance by which my invention has promoted the art.

I claim:

1. A sterilant comprising a mixture of ethylene oxide, dichlorodifluoromethane and trichloromonofluoromethane in proportions substantially as shown graphically in the drawing and stated in terms of mole percent of dichlorodifluoromethane according to the formula:

$$L+E+H=100$$

when $$E \gtreqless 22+0.78L-.021L^2+.00011L^3$$

where L is the mole percent of dichlorodifluoromethane, E is the mole percent of ethylene oxide and H is the mole percent of trichloromonofluoromethane.

2. A sterilant comprising a mixture of up to approximately 30 mole percent of ethylene oxide, from approximately 16.2 to 28.5 mole percent of dichlorodifluoromethane and the balance trichloromonofluoromethane, and characterized by being non-flammable in all liquid-vapor phase relationships.

3. A sterilant comprising a mixture of up to approximately 30 mole percent of ethylene oxide, from approximately 41.5 to approximately 53.8 mole percent of trichloromonofluoromethane and the balance dichlorodifluoromethane and characterized by being non-flammable in all liquid-vapor phase relationships.

4. The process of sterilizing an article comprising the steps of placing the article to be sterilized within a chamber, releasing into said chamber a mixture of ethylene oxide, trichloromonofluoromethane and dichlorodifluoromethane in proportions according to the formula:

$$L+E+H=100$$

when $$E \gtreqless 22+0.78L-.021L^2+.00011L^3$$

where L is the mole percent of dichlorodifluoromethane, E is the mole percent of ethylene oxide and H is the mole percent of trichloromonofluoromethane, and exposing said article to said mixture at or above the temperature of vaporization of ethylene oxide.

References Cited in the file of this patent

UNITED STATES PATENTS

| | | |
|---|---|---|
| 1,791,429 | Roark et al. | Feb. 3, 1931 |
| 2,037,439 | Schrader et al. | Apr. 14, 1936 |
| 2,075,845 | Gross et al. | Apr. 6, 1937 |
| 2,321,023 | Goodhue et al. | June 8, 1943 |
| 2,524,590 | Boe | Oct. 3, 1950 |
| 2,529,092 | Lodes | Nov. 7, 1950 |
| 2,562,870 | Owen | July 31, 1951 |

OTHER REFERENCES

Fulton: "Propellants for Low-Pressure Liquefied Gas Aerosols," Ind. and Eng. Chem., vol. 40, No. 4, April 1948, pp. 699, 700.

Goodhue: "Low and Moderate Pressure Liquefied-Gas Aerosols," Ind. and Eng. Chem., vol. 41, No. 7, July 1949, pp. 1523–27.

Reed: "The Propellant in Aerosol Products," J. Soc. Cos. Chem., vol. 7, No. 2, March 1956, pp. 137, 138, 140, 141, 143, 144.

Disclaimer 2,891,838.—*Saul Kaye*, Maple Heights, Ohio. NON-INFLAMMABLE ETHYLENE OXIDE STERILANT. Patent dated June 23, 1959. Disclaimer filed June 30, 1965, by the assignee, *Ben Venue Laboratories, Inc.*

Hereby enters this disclaimer to claim 4 of said patent.

[*Official Gazette September 28, 1965.*]